United States Patent
Johnson

[15] 3,693,767
[45] Sept. 26, 1972

[54] ADJUSTABLE HYDRAULIC SHOCK ABSORBER

[72] Inventor: Kermit B. Johnson, Jamestown, N.Y.

[73] Assignee: Hydraulic Products Corporation, Jamestown, N.Y.

[22] Filed: Nov. 5, 1970

[21] Appl. No.: 87,224

[52] U.S. Cl. ................. 188/285, 188/287, 188/318
[51] Int. Cl. ............................................. F16f 9/48
[58] Field of Search....... 188/282, 285, 287, 315, 318

[56] References Cited

UNITED STATES PATENTS

| | | | |
|---|---|---|---|
| 3,510,117 | 5/1970 | Scholin et al. | 188/287 X |
| 3,478,846 | 11/1969 | Germond | 188/285 |
| 3,605,960 | 9/1971 | Singer | 188/287 |
| 3,201,110 | 8/1965 | Taccone | 188/287 |

*Primary Examiner*—George E. A. Halvosa
*Attorney*—Christel & Bean

[57] ABSTRACT

A shock absorber comprising a housing, a cylinder mounted within the housing, and a metering sleeve surrounding the cylinder. The cylinder wall is provided with longitudinally spaced openings communicating with annular grooves formed in the exterior of the cylinder wall. The metering sleeve is provided with longitudinally spaced openings adapted to register with the grooves of the cylinder wall to form composite orifices for the egress of fluid from within the cylinder to an annular reservoir in the housing upon the application of a load to the piston rod. The metering sleeve is adjustably slidable relative to the cylinder to vary the effective size of the orifices. The annular grooves take various cross-sectional shapes to control the flow characteristics of the fluid through the orifices.

9 Claims, 7 Drawing Figures

ADJUSTABLE HYDRAULIC SHOCK ABSORBER

BACKGROUND OF THE INVENTION

This invention relates generally to shock absorbers and, more particularly, to hydraulic shock absorbers having adjustable orifice metering means.

It is known in the art of shock absorbers to provide a plurality of openings or orifices in the cylinder wall of a shock absorber arranged in such a manner that as a piston moves within the cylinder under the influence of a load, the piston progressively closes off these openings, thereby making available a lesser number of orifices to effect a deceleration of the piston and thereby the load acting against the piston. The rate at which the fluid is allowed to escape is dependent on the shape and size of the orifices which are accordingly designed in accordance with the load to be decelerated and other design considerations.

One problem encountered in these devices is that a change in the speed or mass of the load, which is to be decelerated and stopped, has an effect upon the ability of the absorber to perform its work effectively. It will be apparent that if the total orifice size is fixed, changes in load will alter the cushioning effect. Accordingly, it has been found desirable to adjust the effective orifice size in accordance with the change in load.

SUMMARY OF THE INVENTION

The shock absorber of the present invention, as hereinafter described, provides a new and improved orifice metering means having novel means for adjusting the effective orifice size area in accordance with various load conditions.

Generally speaking, the shock absorber of the present invention comprises an outer tubular housing, a cylinder mounted within the housing, and a metering sleeve surrounding the cylinder in telescopic relation therewith and axially movable relative thereto. The cylinder contains a piston connected to one end of a piston rod, the other end of the piston rod having a load receiving bumper or connector attached thereto. The cylinder is provided with a plurality of longitudinally spaced openings communicating with annular grooves in the exterior of the cylinder. The metering sleeve also is provided with longitudinally spaced openings adapted to register with the grooves of the cylinder.

The cylinder openings and annular grooves together with the metering sleeve openings constitute orifices for the outflow of fluid from the cylinder to an annular reservoir in the housing. The metering sleeve is axially movable relative to the cylinder to adjust the effective orifice area size in accordance with the load imparted to the bumper. The annular grooves provided in the wall of the cylinder may take various configurations to control the flow characteristics of the fluid through the orifices.

BRIEF DESCRIPTION OF THE DRAWING

FIG. 3 is an elevational view taken at right angles to FIG. 1, illustrating a manual control for the adjustable orifice metering means;

DETAILED DESCRIPTION OF A PREFERRED EMBODIMENT

Figure 1:
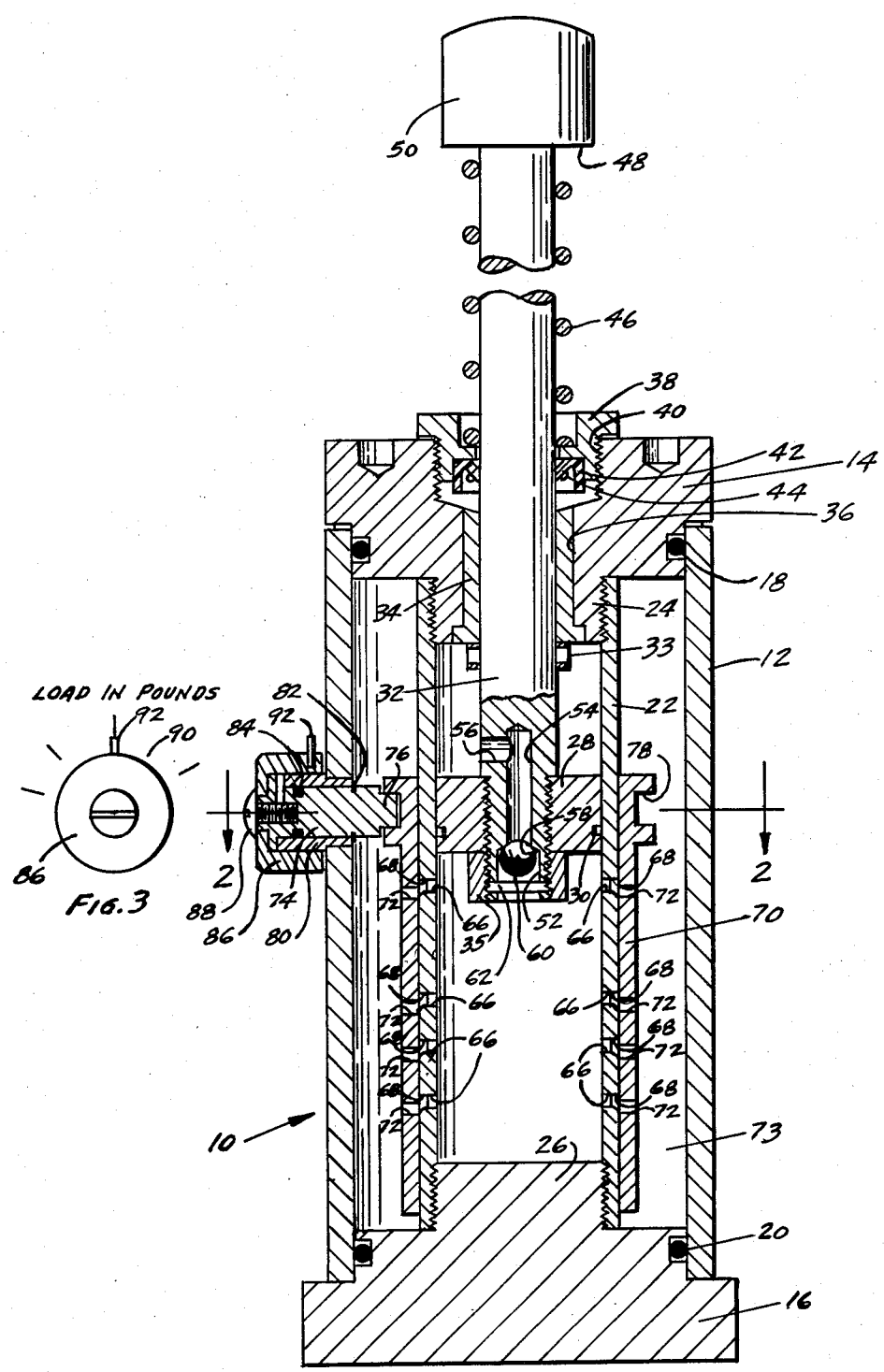
FIG. 1 is a longitudinal cross sectional view taken centrally through one form of a shock absorber constructed in accordance with the present invention.
Figure 2:
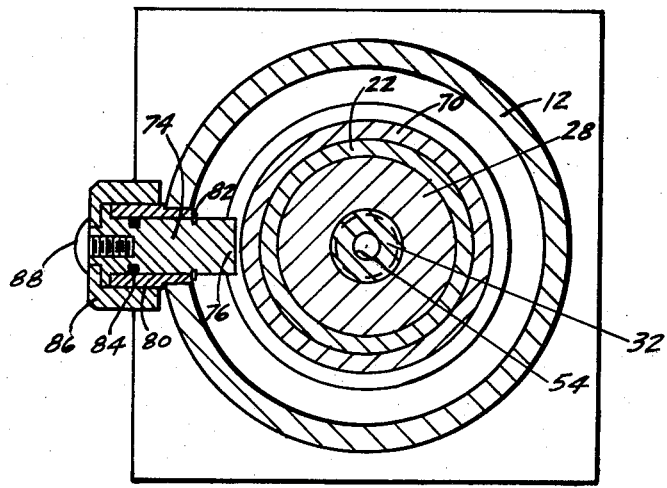
FIG. 2 is a cross sectional view taken on the line 2—2 of FIG. 1.

Referring now in detail to the drawings, there is shown in FIG. 1 a preferred embodiment of a shock absorber, generally designated 10 and constructed in accordance with this invention, comprising an outer housing or cylindrical shell 12, an upper end plate or head 14, and a lower end plate or head 16, all suitably secured together in any conventional manner. A pair of 0-ring seals 18 and 20 are disposed in corresponding grooves in end plates 14 and 16, respectively, to provide a fluid tight seal between the end plates and the housing.

An inner tube or hollow cylinder 22 is mounted within housing 12 and has threaded connections at its opposite ends to externally threaded bosses 24 and 26 projecting axially inwardly of end plates 14 and 16, respectively.

The shock absorber 10 includes a piston 28 mounted within cylinder 22 for reciprocating movement relative thereto. A suitable seal 30 is disposed in a peripheral groove formed in piston 28 for providing pressure sealing between the latter and the interior wall of cylinder 22. The piston 28 has threaded connection with the inner, threaded end portion of a piston rod 32 extending outwardly through a bearing 34 mounted within a central axial opening 36 in the upper end plate 14. A piston rod wiper 33 is disposed about piston rod 28 adjacent the inner end of bearing 34. A nut 35 is threaded on the inner end of piston rod 32 for securing piston 28 in position on rod 32.

Also mounted in the upper end plate 14 on the outer face thereof is a packing retainer 38 threaded into a tapped opening 40 communicating with opening 36. The packing retainer 38 has a recess in its inner face for supporting an annular piston rod wiper 42 held in bearing engagement about piston rod 32 by means of a spring retainer 44. Also, a recess is provided in the outer face of a packing retainer 38 for receiving one end of a coil spring 46, the other end of spring 46 abutting a shoulder 48 formed on a bumper 50 provided on the upper, distal end of piston rod 32.

The inner or lower end of piston rod 32 is provided with an axial opening 52 communicating with a longitudinally extending passage 54 which in turn communicates with a transverse passage 56 leading to the interior of the cylinder 22 on one side of the piston 28. An annular beveled shoulder 58 surrounds the inlet end of passage 54 and provides a seat for a ball check valve 60 adapted to close passage 54 against fluid flow in one direction. A suitable retainer 62 is mounted in the nut 35 adjacent the end of piston rod 32 to retain ball check valve 60 within the opening 52.

During the downstroke of piston 28 with a load applied to bumper 50, the ball check valve 60 will be seated by fluid pressure to close passage 54. On the return stroke, any fluid trapped in cylinder 22 on the upper side of piston 28 can escape through passages 56 and 54 and past the ball check valve 60 as will hereinafter be more fully described.

A plurality of longitudinally spaced openings 66 are formed in the wall of cylinder 22 for the egress of fluid from cylinder 22 below piston 28 upon the downstroke of piston 28 caused by a load or force applied to the bumper 50. As the piston 28 moves downwardly, it successively covers the openings 66 to correspondingly decrease the outlet flow area causing less fluid to escape cylinder 22 and thereby decelerating and gradually stopping the movement of any load applied to the bumper 50.

In accordance with this invention, the wall of cylinder 22 is provided with a plurality of annular grooves 68, corresponding to and communicating with openings 66, to further adjustably control the outflow of fluid from cylinder 22 as will hereinafter become apparent. As will presently be described, these grooves 68 can be of various cross sectional forms to affect the fluid outflow characteristic so that various controlled conditions can be satisfied.

An intermediate adjustable metering tube or sleeve 70 is mounted in a sliding telescopic manner around cylinder 22. The metering sleeve 70 functions to control the flow of escaping fluid through openings 66 and grooves 68 in cylinder 22 during the downstroke of piston 28. The metering sleeve 70 is provided with a plurality of longitudinally spaced openings 72 corresponding to openings 66. Surrounding the metering sleeve 70 is a fluid reservoir 73 defined by the outer surface of cylinder 22, the inner surface of the outer tube or housing 12, and the upper and lower end plates, 14 and 16. The openings 66, grooves 68 and openings 72 form composite orifices metering the flow of fluid from cylinder 22 into reservoir 73.

Means are provided for moving metering sleeve 70 axially relative to cylinder 22, such means comprising a rotatable stub shaft 74 having an eccentric reduced diameter portion 76 received in an annular groove 78 provided at the upper end of sleeve 70. The shaft 74 extends through a bearing 80 mounted in an opening in the wall of outer tube or housing 12, the shaft 74 being held in place by a retainer ring 82. A suitable seal 84 is disposed in a peripheral groove in shaft 74 for providing a fluid tight seal between the latter and bearing 80. A rotatable cup-shaped knob 86 having a flange overlying bearing 80 is rigidly secured to shaft 74 by a suitable fastener 88 for rotation therewith. Thus, by rotating knob 86 and thereby shaft 74, the metering sleeve 70 is caused to move axially relative to cylinder 22 to adjust the total outlet flow area or orifice area for the fluid escaping from cylinder 22 into reservoir 73.

In order to adjust the amount of total outlet flow area or orifice area opening required to correspond to the load imparted to bumper 50, a radial scale 90 may be inscribed on the outer surface of housing 12, the scale 90 having indicia thereon representing units of force or load in pounds. A pointer 92 is provided on knob 86 and may be set to indicate the desired load. As knob 86 is turned to set pointer 92 to the desired loading, shaft 74 will also be rotated the same amount causing adjusting sleeve 70 to move relative to cylinder 22 a corresponding distance to vary the total size of the orifice opening area accordingly.

In use, the shock absorber 10 of the present invention will initially be in the position shown in FIG. 1 with the cylinder 22 and reservoir 73 filled with fluid substantially up to the level of piston 28 and the spring 46 urging the bumper 50 and piston 28 to the respective extended positions shown. Knob 86 can then be manipulated to set pointer 92 at a known load weight. This in turn causes axial movement of metering sleeve 70 relative to cylinder 22 a corresponding amount to adjust the orifice size openings for the given load weight.

Upon the application of a load to bumper 50, the piston rod 32 and piston 28 move downwardly forcing fluid from cylinder 22 through the metering orifices comprised of openings 66, grooves 68 and openings 72 into reservoir 73. As the piston 28 moves past and closes off successive openings 66 and their corresponding orifices, there is a reduction in the number of openings and corresponding orifices available, and hence in the total effective area of the orifices, through which fluid can be displaced from cylinder 22. The resistance to fluid flow through these orifices increases because of the reduction of the total effective area thereto to cause the piston to slow down and dissipate the load on the bumper 50. This action continues until the load on bumper 50 is completely dissipated or the lowermost opening 66 is covered whereby no fluid can be displaced from cylinder 22.

Should piston 28 move completely past any one or more openings 66 and their corresponding orifices during the downstroke thereof, fluid will be metered through such openings and orifices from reservoir 73 into the space above and behind piston 28. However, the ball check valve 60 will remain seated since the pressure differential is greater on the front or lower face of piston 28 than on the upper or rear face thereof.

When the load on bumper 50 is removed, the piston 28 will move outwardly or upwardly to its original position under the influence of spring 46. As piston 28 is moved upwardly on the return stroke, the fluid will be returned to the lower end of cylinder 22 from the space behind piston 28 via passages 56, 54, and opening 52 past the ball check valve 60 which will be forced into the open position by the fluid pressure above the valve. Also, fluid will flow from reservoir 73 into cylinder 22 below the piston 28 through openings 66 and their corresponding orifices, as piston 28 uncovers the same on the return stroke.

Figure 4:
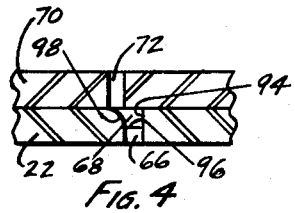
FIGS. 4, 5 and 6 are fragmentary longitudinal sectional views, on an enlarged scale, showing various cross sectional forms of the grooves provided in the cylinder wall of the shock absorber of this invention.

A significant feature of this invention is the specific configuration of annular grooves 68 which may take various forms for varying the effective orifice area of cylinder 22 to control the flow characteristics of the fluid in the shock absorber in accordance with varied load conditions and design requirements. As shown in FIG. 4, the preferred effective cross sectional configuration of groove 68 is defined by a side wall 94, a bottom wall 96 and a curved arcuate opposite side wall 98 extending from opening 66 at bottom wall 96 to the exterior of cylinder 22 to form a groove having a progressively wider or larger opening from the inner to the outer end thereof. By forming wall 98 on an arcuate curve or radius, a very sensitive adjustment of the effective orifice size can be made upon axial sliding movement of metering sleeve 70 relative to cylinder 22.

Figure 5:
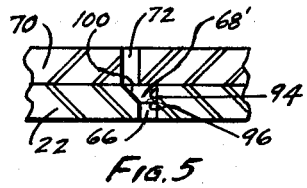

FIG. 5 illustrates another form of groove 68' having a cross-sectional configuration which also becomes progressively wider from the inner to the outer end thereof but which is provided with a sloped or inclined side wall as at 100, rather than an arcuate side wall as in the first form described.

Figure 6:
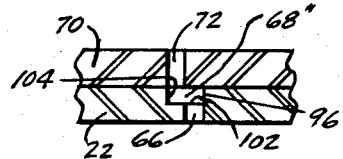

FIG. 6 illustrates still another form of groove 68'' having a rectangular or square cross-sectional configuration and which differs from the prior forms by having opposed side wall surfaces 102 and 104 disposed in a parallel relation.

Figure 7:
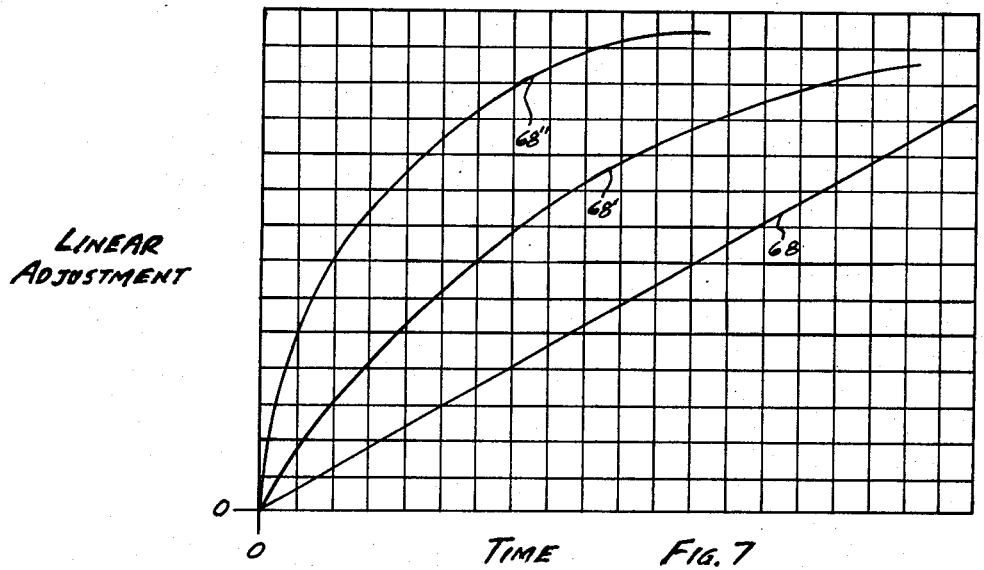
FIG. 7 is a diagrammatic view illustrating the effect of the cylinder groove cross sectional configuration on a graph correlating the length of linear adjustment of the metering sleeve to the time of operation of the shock absorber of this invention.

FIG. 7 graphically illustrates the effect of the cylinder groove shape on a graph which correlates the linear adjustment of metering sleeve 70 in inches or fractions thereof to the time of operation of the shock absorber 10 in seconds or fractions thereof. The grooves 68, 68' and 68'' are represented by lines identified by the same reference numerals on the graph. It will be observed that the line representing groove 68 results in a linear relationship between the two quantities as opposed to the curvilinear relationships of the other grooves 68' and 68'', respectively. This linear relationship is particularly desirable because it facilitates making repeated adjustments of the metering sleeve 70 for similar load conditions and enables the time quantity to be reliably predicted.

The present invention thus provides a new and improved shock absorber having novel adjustable orifice metering means for varying the effective orifice area size in accordance with the external load imparted to the piston rod of the shock absorber. By the provision of annular grooves in the cylinder, the problem of radial misalignment between the cylinder openings and the metering sleeve openings is eliminated. Also, the cross-sectional configuration of the annular grooves may be varied to affect the flow characteristics of the fluid through the openings in order to satisfy various controlled conditions.

Illustrative embodiments of this invention having been herein described and illustrated in the drawings, it is to be understood that modifications thereof can be made without departing from the spirit and scope of this invention.

I claim:

1. A shock absorber comprising: a cylinder, a piston mounted in said cylinder, a piston rod connected to said piston and extending outwardly of said cylinder for receiving a load, a sleeve surrounding said cylinder in telescopic relation therewith, a plurality of openings in the wall of said cylinder, a plurality of annular grooves in said cylinder in registry with said openings and extending about the entire periphery of said cylinder, said annular grooves being wider at the periphery of said cylinder than said cylinder openings, a plurality of openings in said sleeve adapted to register with said grooves, said cylinder openings, grooves and sleeve openings constituting orifices providing egress for fluid in said cylinder when subjected to pressure under the influence of a load applied to said piston rod, and means for adjusting said sleeve axially relative to said cylinder for adjusting the effective area size of said orifices by adjusting the area of communication of each sleeve opening with its corresponding annular cylinder groove.

2. A shock absorber according to claim 1 including a housing surrounding and spaced from said sleeve defining a reservoir therebetween.

3. A shock absorber according to claim 1 wherein said plurality of cylinder openings, grooves and sleeve openings are spaced axially along said cylinder and sleeve, respectively.

4. A shock absorber according to claim 1 wherein said sleeve adjusting means comprises a peripheral groove in said sleeve and a shaft having an end portion disposed in said groove and eccentric means whereby rotation of said shaft effects axial adjusting movement of said sleeve.

5. A shock absorber according to claim 1 wherein said piston rod has passage means establishing communication between opposite sides of said piston in said cylinder and check valve means for closing said passage means against fluid flow therethrough from the working face of said piston.

6. A shock absorber according to claim 1 wherein each of said annular grooves is defined by spaced, parallel side walls.

7. A shock absorber according to claim 1 wherein each of said annular grooves has a cross sectional configuration defined by spaced side walls, said side walls diverging from each other to define an opening which becomes progressively larger from said cylinder openings to the exterior of said cylinder.

8. A shock absorber according to claim 7 wherein the one of said spaced side walls lying adjacent to said sleeve opening is arcuately shaped in an outwardly flaring direction.

9. A shock absorber according to claim 7 wherein the one of said spaced side walls lying adjacent to said sleeve opening is inclined outwardly.

* * * * *